July 20, 1965   J. MÜLLER   3,195,413
CONSOLE MILLING MACHINE
Filed Dec. 2, 1963

INVENTOR.
JOHANN MÜLLER
BY *Rupert J. Brady*
ATTORNEY

United States Patent Office 3,195,413
Patented July 20, 1965

3,195,413
CONSOLE MILLING MACHINE
Johann Müller, Munich, Germany, assignor to Hans Deckel, Munich, Germany, and Friedrich Wilhelm Deckel, Zug, Switzerland
Filed Dec. 2, 1963, Ser. No. 327,442
Claims priority, application Germany, Dec. 21, 1962, D 40,567
8 Claims. (Cl. 90—17)

This invention relates broadly to milling machines having console type table carriers and more particularly to a universal milling machine having a plurality of tool spindles.

One of the objects of the present invention is to provide a construction of a relatively small console type milling machine which is capable of carrying out heavy milling jobs.

Another object of the invention is to provide a construction of milling machine having a console-like table carrier, having improved spindle head stability and increased stability for the guidance of the table in all three coordinate directions.

Still another object of the invention is to provide a construction of milling machine having a plurality of tool spindles to permit machining of work pieces of different sizes.

A further object of the invention is to provide a construction of milling machine wherein a plurality of tool spindles can be pivoted from one plane to another to provide a universal milling machine for machining work pieces from different directions while maintaining the dimensions of the machine at a minimum.

Still a further object of the invention is to provide a construction of milling machine having increased accuracy of the table console guidance and enlargement of the longitudinal and transverse guidance of the table.

Other and further objects of the invention reside in the swivel connection of the spindle head to the upstanding machine columns, the arrangement of rails on the spindle head and top surfaces of the machine columns for bringing additional tool heads and accessories into a position of use on the spindle head from stored positions on the machine columns as set forth more particularly in the specification hereinafter following by reference to the accompanying drawing, in which.

Figure 1:
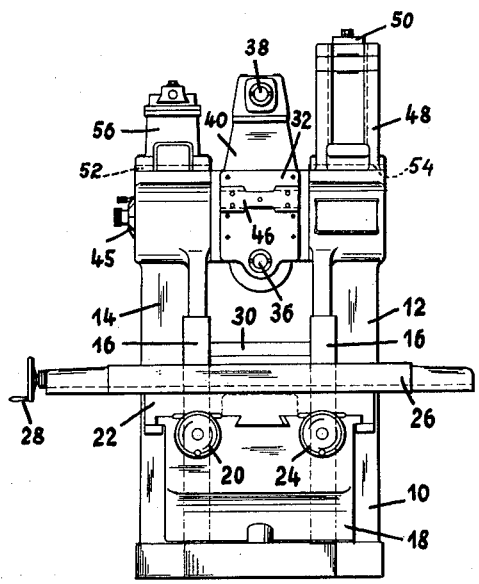
FIGURE 1 is a front elevational view of the milling machine of the invention, showing the tool spindles in horizontal position and an additional tool head and accessory stored on the top surfaces of the machine columns.

Referring to the drawings in greater detail, the machine frame or stand 10 is U-shaped having a pair of spaced columns 12 and 14 perpendicularly connected to a base member and extending upwardly therefrom. A chucking or work table console 18 is connected on vertical guides 16, connected to the front faces of dual columns 12 and 14, with the console being vertically adjustable up and down these guides by handwheel 20. Due to the U-shape of the dual column machine stand the vertical guides 16 are spaced relatively far apart and the console table carrier 18 is movable on these guides by well-known mechanisms in the art, such as a vertical threaded spindle or by hydraulic means. The relatively large spacing between the vertical guides 16 increases the accuracy and stability of the vertical guidance of the console and enables the longitudinal and transverse dimensions of the console to be larger than those of consoles on conventional milling machines of comparable size. The arrangement of the machine stand also enables the vertical guides 16 to extend upwardly from the base a substantial distance to provide increased vertical adjustability for the console.

Figure 2:
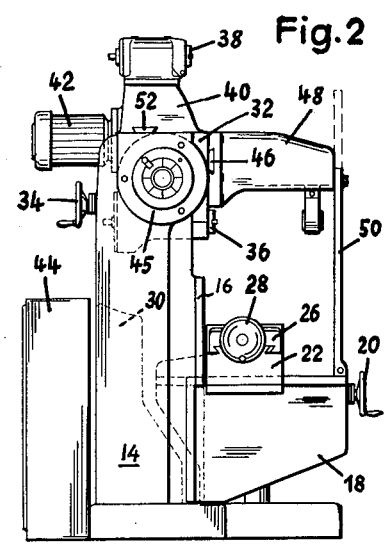
FIGURE 2 is a side elevational view of the machine of FIGURE 1, with parts omitted, and showing a support accessory connected to the spindle head guide.

A cross-slide 22 is connected in guides, in the usual manner, well known in the art, on the top surface of console 18 and is transversely movable thereon toward and away from the machine stand by handwheel 24. The upstanding columns 12 and 14 are connected at the lower portions adjacent the rear faces thereof by a connection member 30, such as shown in FIG. 2, so that the transverse surface of console 18 extends into the space between the columns, as shown, so that the transverse guides of the work table, namely, the transverse guide of cross-slide 22, can be made rather long. A longitudinal slide 26 is connected on longitudinal guides on cross-slide 22, and is longitudinally adjustable thereon, in the usual manner, by handwheel 28. This slide comprises the work or chucking table and carries a plurality of chucking grooves in the upper surface in the usual manner. Since the console 18 is longitudinally broad due to the great distance between the vertical guides 16, cross-slide 22 also has substantial length as shown in FIG. 1, thus enabling the longitudinal guidance of the table to be enlarged relative to other machines of this same general size. Thus this construction enables the guidance of the work table to be increased in length in all three coordinate directions to very favorably increase the stability of the guidance of the table and enable it to support and accurately move relatively large work pieces to enable the machine to carry out heavy milling jobs even though the machine itself is relatively small.

The inwardly facing surfaces of the upper portions of machine columns 12 and 14 are constructed as flanges, and a spindle head 32 is rotatively journaled between these flanges on a horizontal axis extending parallel to the longitudinal movement of the work table longitudinal slide 26. The swivel joint or axis of spindle head 32 is connected through gearing, not shown, so that it can be rotated to swivel the spindle head around this horizontal axis to selected positions by handwheel 34. To be a universal milling machine, the machine must have both a horizontal as well as a vertical tool spindle so that a work piece can be machined from different directions on the same machine without transferring the work piece to different milling machines. For this reason spindle head 32 carries two tool spindles 36 and 38 thereon. Tool spindles 36 and 38 are disposed parallel with each other and extend in the same direction, with their respective axes disposed in a vertical plane which is parallel to the transverse movement of the work table. The tool spindles 36 and 38 are disposed on opposite sides of the horizontal swivel axis of spindle head 32, with tool spindle 38 connected outwardly of spindle head 32 by radial arm member 40 extending between the two elements such that the swivel axis lies in an off-center position between tool spindles 36 and 38, in such a manner that when the spindles are disposed in horizontal position, facing the work table, as shown in FIGS. 1–3, the swivel axis is closer to the lower spindle 36 than it is to the upper spindle 38.

Figure 3:
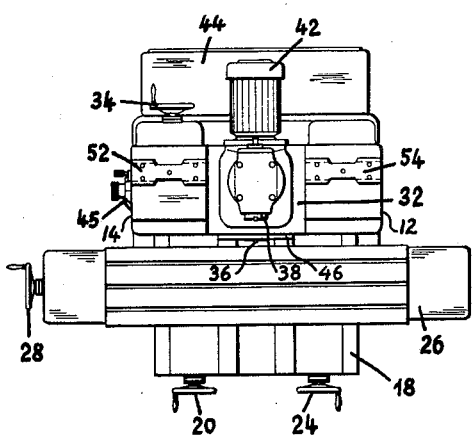
FIGURE 3 is a top plan view of the machine of FIGURES 1 and 2, with parts omitted.
Figure 4:
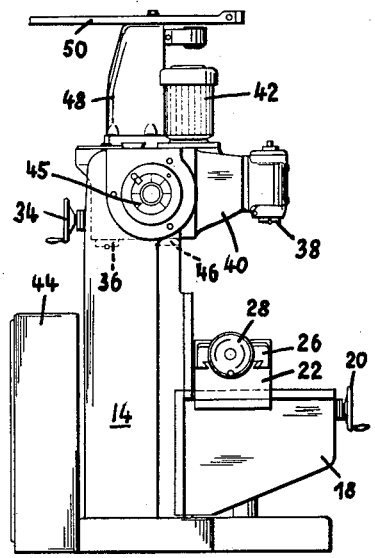
FIGURE 4 is a side elevational view similar to FIGURE 2, but showing the tool spindles in vertical position.

Spindle head 32 is adjustable to dispose the tool spindles 36 and 38 in two main working positions in which the spindles are either disposed horizontal, as shown in FIGS. 1–3, to provide a horizontal milling machine, or are disposed vertically, facing downwardly, as shown in FIG. 4, to provide a vertical milling machine. When the spindles are in horizontal position the upper spindle 38 is utilized for machining particularly high work pieces, while the lower spindle 36 is used for machining large work pieces at a lower level, or work pieces which are relatively short in height. When the tool spindles 36 and 38 are moved to the vertical position as shown in FIG. 4, by swiveling spindle heads 32 clockwise 90° about its swivel axis, by manipulation of handwheel 34, they are disposed to provide machining of the top surface of a work piece or to machine work pieces whose width exceeds the adjustment range of the table in the transverse direction.

Spindles 36 and 38 which are arranged to receive various types of cutting heads are driven selectively or together by means of motor 42 mounted on the rear face of spindle head 32. The switch gear for motor 42 and the feed and approach movements are housed in cabinet 44 behind the machine stand 10, and the changeover-mechanism, not shown, for the tool spindles, built into spindle head 32, is actuated by a handwheel mechanism 45 disposed on the outer side surface of column 14 in alignment with the swivel axis. The feature of mounting the spindle head 32 between the vertical arms of the U-shaped dual column machine stand gives the column the stability of a closed frame because the swivelly-mounted spindle head has the effect of a top traverse beam closing the U-frame. Also the spindle head itself attains excellent stability during operation since it is mounted in the frame at both ends.

A receiving rail 46 is connected to the front face of spindle head 32, intermediate the tool spindles 36 and 38 and this rail extends horizontally from one end of the spindle head to the other and is adapted to align flush with corresponding rails 52 and 54 connected to the top surfaces of the machine columns 14 and 12, respectively, when the spindle head 32 is swiveled counterclockwise 90° from the position of the machine indicated in FIG. 2. It is thus to be noted that handwheel 34 is capable of swiveling spindle head 32 through 180° counterclockwise from the position shown in FIG. 4. As illustrated in FIG. 1 a tool head 56 for press work may be slidably engaged on rail 52 and a spindle head counter support 48 or other detachable supplementary milling machine tools may be slidably mounted on rail 54 on top of column 12 as illustrated in FIGS. 1 and 4. Various tools and accessories can be slidably engaged by the rails 52 and 54 to store the tools and accessories on the top surfaces of the machine columns, to reduce storage space and utilize the generally wasted space above the machine. When the spindle head 32 is rotated so that rail 46 comes into flush alignment with rails 52 and 54 the relatively heavy tool or accessory can be slidably moved from either the rail 52 or 54 into sliding engagement with rail 46 to thus be securely mounted thereon without having to lift the relatively heavy tool or accessory onto the machine. In this way substantial time and effort is saved in replacing one tool or accessory with another. Spindle head 32 is then rotated to either the horizontal position as illustrated in FIG. 2 or the vertical position as illustrated in FIG. 4 for carrying out the desired machining activity.

The counter support 48 shown in the stored position in FIGS. 1 and 4 can be mounted on spindle head 32 in the manner just described, and the spindle head is then swiveled 90° to the position shown in FIG. 2 where the bracket 50 carried by the support is extended downwardly and detachably fastened to the top surface of console 18, as shown in FIG. 2, and then tightened to brace counter support 48. The counter support 48 and brace 50 then serve as an auxiliary brace for horizontal milling work. As indicated, a bearing may be carried by the counter support outwardly thereon and in alignment with tool spindle 36 to provide for supporting a cutting tool at both ends.

When it is desired to remove one accessory from rail 46 of the spindle head and replace it with another, the spindle head is again rotated upwardly into alignment with rails 52 and 54 and accessories and tools may be selectively yieldably moved onto and off of the various rails to mount the desired tool on rail 46 with very little effort.

It will be noted that the radial arm member 40 which connects tool spindle 38 with spindle head 32 positions tool spindle 38, when in its vertical position, as shown in FIG. 4, a substantial distance outwardly of the machine frame so that it is in substantially the same vertical position as that of the usual rigidly mounted vertical spindle of a vertical milling machine or of the detachable vertical spindle of the usual type universal milling machine.

While the invention has been described in certain preferred embodiments it is realized that modifications can be made and it is to be understood that no limitations upon the invention are intended other than those imposed by the scope of the appended claims.

What I claim as new and desire to secure by Letters Patent of the United States, is as follows:

1. A milling machine comprising, a machine stand, a chucking table adapted to receive a work piece and movable in three coordinate directions mounted on said machine stand, a swivel axis through said machine stand above said chucking table parallel to the longitudinal movement of said table, a spindle head connected to swivel about said axis, and a pair of parallel tool spindles on said spindle head having axes in a vertical plane parallel to the transverse movement of said table.

2. A milling machine as set forth in claim 1 in which said swivel axis is disposed off-center between said pair of tool spindles, whereby when the pair of tool spindles are in horizontal position said swivel axis is closer to the lower tool spindle of said pair than to the upper tool spindle.

3. A milling machine as set forth in claim 2 and a radial arm connecting the upper tool spindle of said pair outwardly of said spindle head.

4. A milling machine as set forth in claim 1 in which said machine stand is U-shaped and includes a pair of upstanding columns, and said spindle head mounted between said upstanding columns and adapted to swivel relative thereto.

5. A milling machine as set forth in claim 4, including vertical guide means connected to said pair of upstanding columns, and said chucking table connected for vertical movement on said vertical guide means for dual vertical guidance of said table.

6. A milling machine as set forth in claim 4 including, first rail means connected to the face of said spindle head intermediate said pair of tool spindles, second rail means connected to the top surfaces of said pair of upstanding columns on opposite sides of said spindle head, and detachable tool means slidably connected on said second rail means and adapted for selective transfer to said first rail means when said spindle head is swiveled about said spindle axis to align said first rail means with said second rail means.

7. A milling machine as set forth in claim 4, including first rail means connected to the face of said spindle head intermediate said pair of tool spindles, and counter support means connected to said first rail means and extending outwardly and downwardly into contact with said table when said pair of tool spindles are in the horizontal position.

8. A milling machine comprising, a pair of upstanding columns disposed in spaced relation, a table movable in three coordinate directions and adapted to receive a workpiece connected to the lower portions of said upstanding columns, a spindle head, said spindle head journaled for rotation between the top portions of said pair of upstanding columns on a swivel axis therethrough parallel to the longitudinal movement of said table, a pair of tool spindles connected to said spindle head, said pair of tool spindles having axes disposed parallel to each other in off-set relation on opposite sides of and normal to said swivel axis in a vertical plane between the pair of upstanding columns, and means for selectively swiveling said spindle head whereby said pair of tool spindles may be rotated from a downwardly directed position to an upwardly directed position.

No references cited.

ANDREW R. JUHASZ, *Primary Examiner.*

WILLIAM W. DYER, Jr., *Examiner.*